(12) United States Patent
Ohhashi

(10) Patent No.: US 9,462,148 B2
(45) Date of Patent: Oct. 4, 2016

(54) IMAGE FORMING APPARATUS

(71) Applicant: Kenichi Ohhashi, Kanagawa (JP)

(72) Inventor: Kenichi Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/926,898

(22) Filed: Oct. 29, 2015

(65) Prior Publication Data
US 2016/0142574 A1 May 19, 2016

(30) Foreign Application Priority Data

Nov. 14, 2014 (JP) ................. 2014-231471

(51) Int. Cl.
*B41J 23/00* (2006.01)
*H04N 1/00* (2006.01)
*G06F 3/12* (2006.01)

(52) U.S. Cl.
CPC ........... *H04N 1/00885* (2013.01); *B41J 23/00* (2013.01); *G06F 3/1221* (2013.01); *G06F 3/1229* (2013.01)

(58) Field of Classification Search
CPC ............... B41J 23/00; H04N 1/00885; H04N 1/00904; H04N 1/00901; H04N 1/00899; G06F 3/1221; G06F 3/1229
See application file for complete search history.

(56) References Cited

U.S. PATENT DOCUMENTS 5,446,905 A * 8/1995 Koshiishi ................ G06F 1/263
 358/412
6,624,834 B2 * 9/2003 Takahashi .............. B41J 2/3558
 347/171

FOREIGN PATENT DOCUMENTS

JP 4-091629 3/1992
JP 2003-323235 11/2003

* cited by examiner

*Primary Examiner* — Thinh Nguyen
(74) *Attorney, Agent, or Firm* — Cooper & Dunham LLP

(57) ABSTRACT

An image forming apparatus includes a first detector to detect the image forming apparatus being driven by an AC adapter, a second detector to detect the image forming apparatus being driven by a battery, a third detector to detect an occurrence of power failure, and a first device to shut down a power supply of the image forming apparatus in a case of the power failure.

5 Claims, 10 Drawing Sheets

IMAGE FORMING APPARATUS

CROSS-REFERENCE TO RELATED APPLICATIONS

This patent application is based on and claims priority pursuant to 35 U.S.C. §119 to Japanese Patent Application No. 2014-231471 on Nov. 14, 2014 in the Japan Patent Office, the entire disclosure of which is hereby incorporated by reference herein.

BACKGROUND

1. Technical Field

The present invention relates to an image forming apparatus.

2. Background Art

Technologies of controlling power supply to continue print operations are known for a printer operable by both an AC adapter and a battery by switching to battery operation when power supply is cut from the AC adapter due to power failure, etc.

There is a technology that a laptop computer having a configuration is introduced that detects power failure and conducts shut down after a particular time elapses for safe shutdown.

However, a conventional battery operable printer automatically continues battery drive when power supply from an AC adapter stops, leading to wasteful battery consumption. For this reason, a problem arises that the printer is not available when it is necessary to drive the printer on the battery.

In this technology, shutdown is not conducted upon detection of charging so that a printer is not available when it is necessary to drive the printer on battery.

SUMMARY

The present invention provides an improved image forming apparatus which includes a first detector to detect the image forming apparatus being driven by an AC adapter, a second detector to detect the image forming apparatus being driven by a battery, a third detector to detect an occurrence of power failure, and a first device to shut down a power supply of the image forming apparatus in a case of the power failure.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
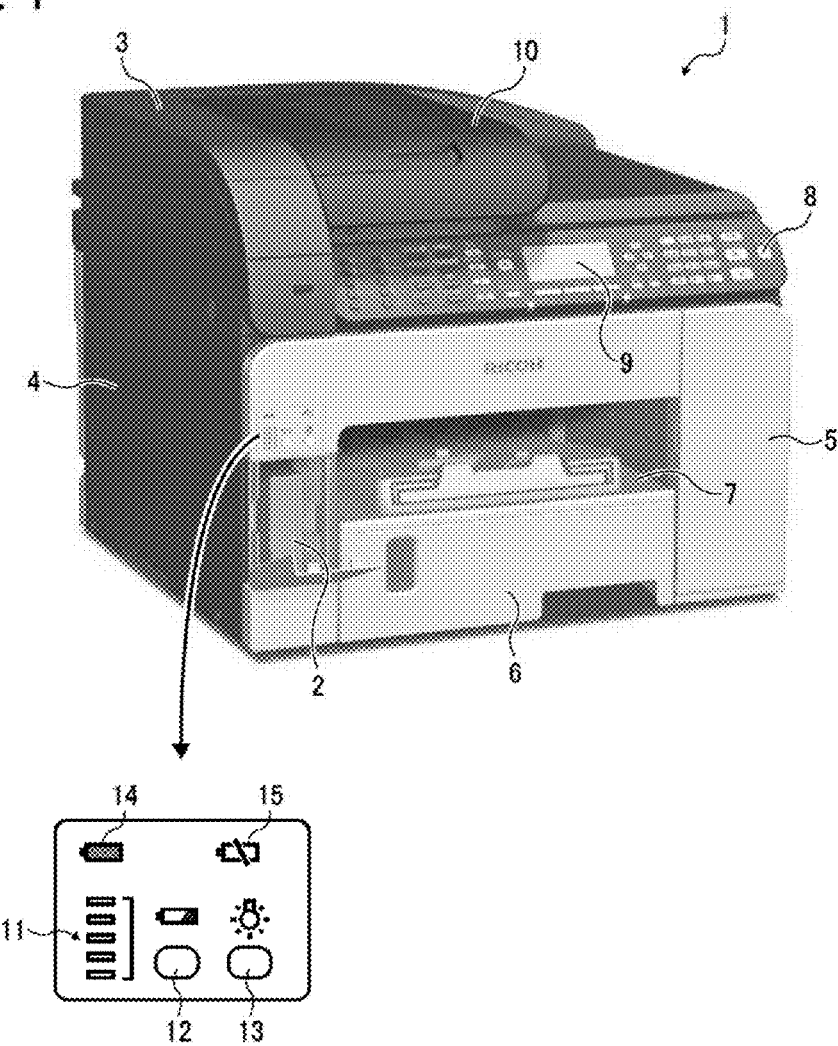
FIG. 1 is a perspective diagram illustrating a multi-functional inkjet printer including a battery according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described in detail with reference to accompanying drawings.

Figure 9:
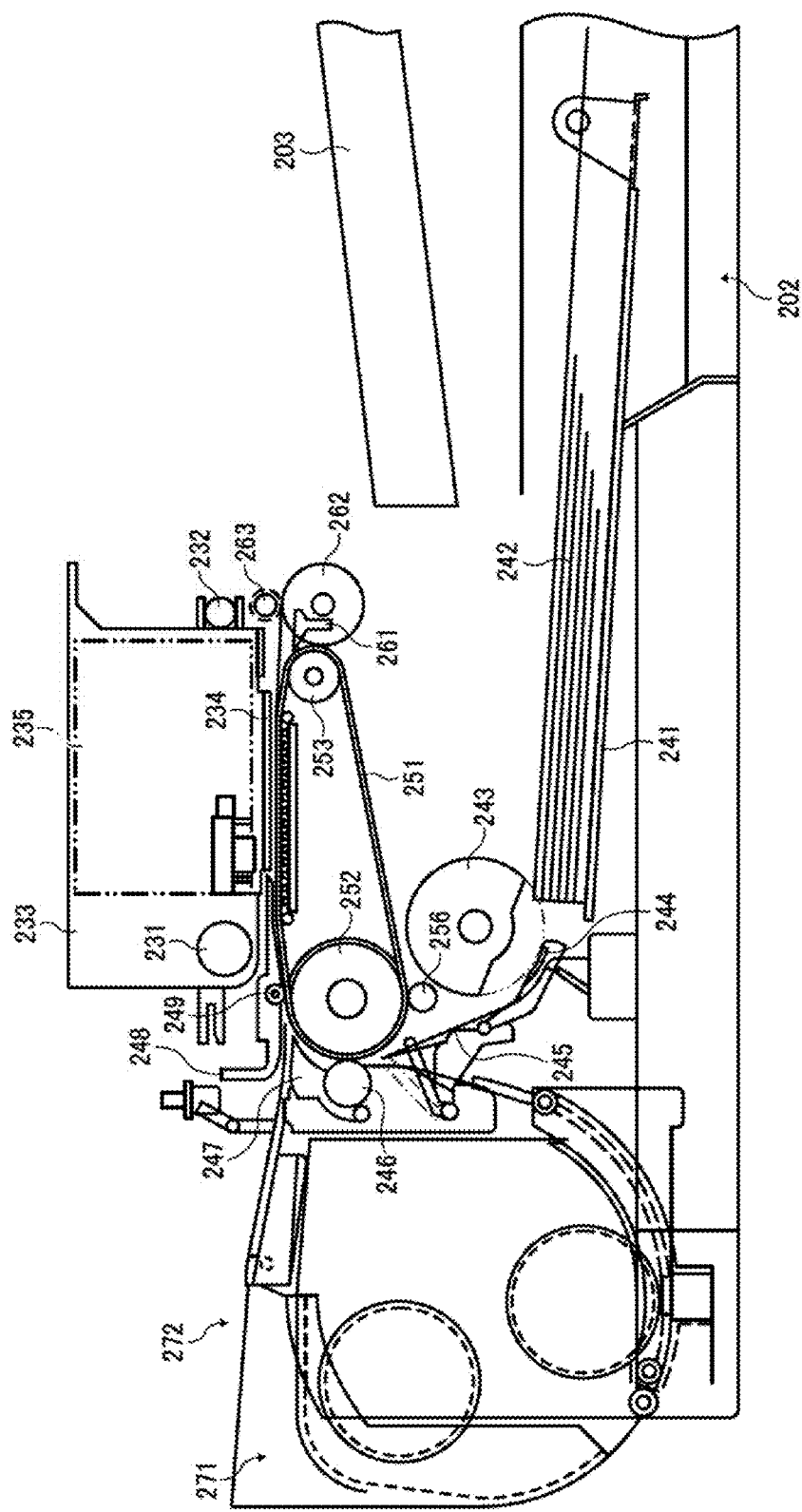
FIG. 9 is a side diagram illustrating the entire configuration of a conventional inkjet recording device.
Figure 10:
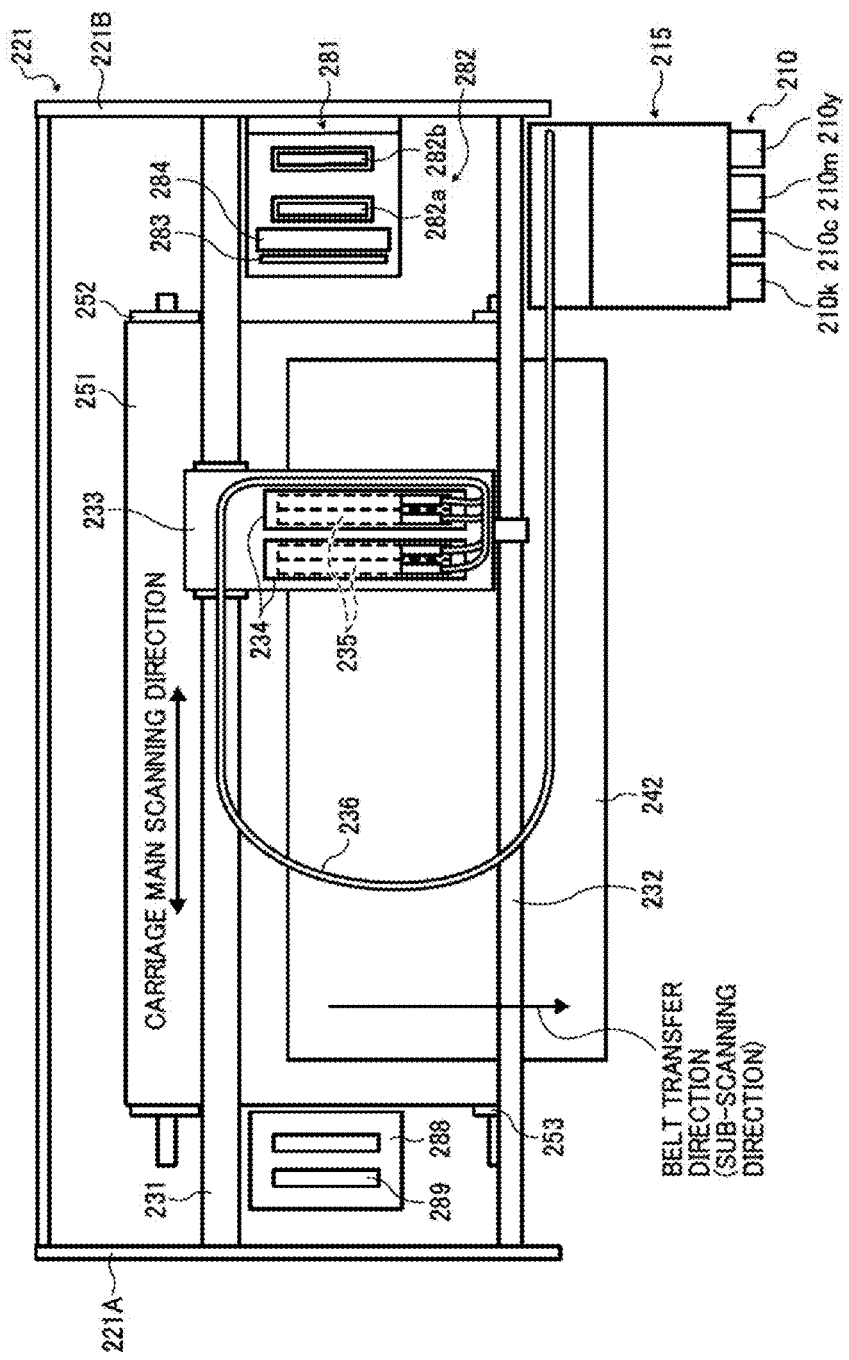
FIG. 10 is a plain diagram illustrating part of droplet discharging head illustrated in FIG. 9.

FIG. 9 is a side view illustrating the entire configuration of a conventional inkjet recording device. FIG. 10 is a plain diagram illustrating part of the droplet discharging head in FIG. 9. Referring to FIG. 9 and FIG. 10, the outlines and mechanisms of the internal configuration of an inkjet recording device are described.

A carriage 233 is slidably supported in the main scanning direction by a stay 232 and a guide rod 231 serving as a guide member laterally bridged between left and right plates, i.e., a side plate 221A and a side plate 221B that constitute a frame 221 and scans in the direction indicated by the arrow in FIG. 10 by a main scanning motor via a timing belt.

The carriage 233 carries a recording head 234 having four droplet discharging heads that discharge ink droplets of each color of yellow (Y), cyan (C), magenta (M), and black (Bk) while multiple ink discharging mouths are arranged in the direction crossing the main scanning direction with the ink droplet discharging direction downward.

As the inkjet recording heads that constitute the recording head 234, it is possible to use a device having a pressure-generating device to discharge ink such as a piezoelectric actuator such as a piezoelectric element, a thermal actuator that utilizes phase changes caused by film boiling of liquid by using an electric heat conversion element such as a heat element, a shape-memory alloy actuator that uses the metal phase change due to the temperature change, and an electrostatic actuator that uses an electrostatic force.

In this embodiment, all the ink discharging mouths can be driven not only at the same time but also at time-division. When all the ink discharging mouths are driven at the same time, recording quality may deteriorate due to cross-talk among all the ink discharging mouths and disadvantages arise such that a large capacity power supply is inevitable to manage a temporarily large current. However, such shortcomings can be solved by time-division methods. This drive head 234 carries a driver IC and is connected to a control unit through a harness (flexible print cable).

The carriage 233 has sub tanks 235 for each color to supply each color ink to the recording head 234. The ink of each color is supplied and replenished to the sub-tank 235 for each color from the ink cartridge 210 mounted onto a cartridge installation unit 215 via an ink supplying tube 236 for each color. A supply pump unit to send out the ink in the ink cartridge 210 is provided to this cartridge installation unit 215. In addition, the ink supply tube 236 is held to a rear plate that constitutes the frame 221 in the middle of crawling the tube by a latching member.

A sheet feeding unit to feed a sheet (recording medium) 242 loaded on a sheet loader (pressure plate) 241 of a sheet feeder tray 202 includes a half-moon shape roller (sheet feeding roller) 243 to separate and feed the sheet 242 one by one from the sheet loader 241 and a separation pad 244 that is made of a material having a large friction index and arranged facing the sheet feeding roller 243 while being biased towards the sheet feeding roller 243.

To feed the sheet 242 fed from the sheet feeding unit below the recording head 234, there are provided a guide member 245 to guide the sheet 242, a counter roller 246, a transfer guide member 247, a pressing member 248 having a top pressing roller 249, and a transfer belt 251 serving as a transfer device to electrostatically adsorb the sheet 242 and transfer the sheet 242 at a position facing the recording head 234.

The transfer belt 251 is an endless form belt, stretched between a transfer roller 252 and a tension roller 253 and rotatable in the belt transfer direction (sub-scanning direction). This transfer belt 251 includes, for example, a top layer serving as a sheet adsorption surface made of a resin material such as a tetrafluoroethylene and ethylene (ETFE) pure material with no resistance control treatment having a thickness about 40 µm and a bottom layer (moderate resistance layer, earth layer) made of the same material as the top layer with resistance control treatment with carbon.

In addition, a charging roller 256 serving as a charger is provided to charge the surface of the transfer belt 251. This charging roller 256 is arranged to be in contact with the top layer of the transfer belt 251 in order to be rotationarily driven to the rotation of the transfer belt 251. Also a particular pressure is applied to both ends of the shaft of the charging roller 256. The transfer roller 252 also plays a role of an earth roller and is arranged to contact the moderate resistance layer (bottom layer) of the transfer belt 251 for grounding.

On the rear side of the transfer belt 251, a guide member 257 is arranged corresponding to the print area of the recording head 234. This guide member 257 maintains a high level of planarity of the transfer belt 251 by protruding the upper surface of the guide member 257 from the tangent of the two rollers (the transfer roller 252 and the tension roller 253) that support the transfer belt 251 toward the recording head 234.

The transfer belt 251 circularly moves in the belt transfer direction (sub-scanning direction) illustrated in FIG. 10 by the transfer roller 252 rotationarily driven by a sub-scanning motor.

Furthermore, as the sheet ejection unit to eject the sheet 242 on which the recording head 234 records an image, there are provided a separation claw 261 to separate the sheet 242 from the transfer belt 251, an ejection roller 262, and a ejection roller 263. A sheet ejection tray 203 is arranged below the ejection roller 262. The sheet ejection tray 203 is arranged to be considerably low from between the sheet ejection roller 262 and the sheet ejection roller 263 to increase the amount of the sheet 242 stored on the sheet ejection tray 203.

A double-face print unit 271 is installed onto the rear side of the inkjet recording device in a detachable manner. The double-face print unit 271 takes in and reverses the sheet 242 returned by the reverse rotation of the transfer belt 251 and feeds it again between the counter roller 246 and the transfer belt 251. In addition, the upper surface of the double-face unit 271 serves as a bypass tray 272.

Furthermore, as illustrated in FIG. 10, a maintenance and recovery mechanism 281 is arranged in the non-image forming area on one side of the carriage 233 in the scanning direction thereof and includes a recovery device to maintain and recover the state of the nozzle of the recording head 234.

The maintenance and recovery mechanism 281 includes each capping member (hereinafter referred to as cap), i.e., 282a and 282b (simply 282 when not distinguished from each other), a wiper blade 283 serving as a blade member to wipe off the nozzle surface, and a dummy discharging receiver 284 to receive droplets discharged not for recording but for dummy discharging to discharge thickened recording liquid. The cap 282a is a suction and moisturizing cap and the cap 282b is a moisturizing cap.

Waste liquid produced from the maintenance and recovery operations by the maintenance and recovery mechanism 281, the ink discharged to the cap 282, the ink attached to the wiper blade 283 and removed by a wiper cleaner, and the ink dummy-discharged to the dummy discharging receiver 284 are discharged to a waste liquid tank.

In addition, as illustrated in FIG. 10, in the non-image forming areas on the other side of the carriage 233 in the main scanning direction, a dummy discharging receiver 288 is arranged to receive droplets discharged not for recording but for dummy discharging to discharge the recording liquid thickened during recording, etc. The dummy discharging receiver 288 includes slits 289 along the direction of the nozzles of the recording head 234.

Furthermore, an interface such as USB to receive and transmit data with a host is arranged inside on the rear side of the inkjet recording device and a control circuit board constituting a control unit to control the entire of the image forming apparatus is provided.

In the inkjet recording device having such a configuration, the sheet 242 is separated and fed from the sheet feeding tray 202 one by one substantially vertically upward, guided by the guide 245, and transferred while being pinched between the transfer belt 251 and the counter roller 246. The top of the sheet 242 is guided by the transfer guide 247 and pressed against the transfer belt 251 by the top pressing roller 249. Thereafter, the transfer direction thereof is changed substantially 90 degrees.

Plus outputs and minus outputs are alternately repeated from the AC bias supplying unit to the charging roller 256 by a control circuit, that is, an alternate bias is applied so that the charging voltage pattern on the transfer belt 252 has an alternate pattern in which plus and minus are alternately charged with a predetermined width in a band-like manner along the sub-scanning direction as circulation movement. When the sheet 242 is fed onto the transfer belt 251 charged with this alternate pattern of plus and minus, the sheet 242 is adsorbed to the transfer belt 251 and transferred thereon in the sub-scanning direction by the circulation movement of the transfer belt 251.

By driving the recording head 234 according to the image signal while moving the carriage 233, ink droplets are discharged to the sheet 242 not in motion to record an image for an amount corresponding to one line and thereafter the sheet 242 is transferred in a predetermined amount to conduct recording for the next line. On receiving a signal indicating that the recording completes or the rear end of the sheet 242 has reached the image recording area, the recording operation stops and the sheet 242 is ejected to the sheet ejection tray 203.

The carriage 233 is moved toward the maintenance and recovery device 281 while standing by for printing (recording) and the recording head 234 is capped with the cap 282 to keep moisturizing the nozzle so that discharging failure ascribable to ink drying is prevented. In addition, the recording liquid is suctioned (referred to as nozzle suction or head suction) from the nozzle by a suction pump with the recording head capped with the cap 282 to discharge thickened recording liquid and air bubbles for recovery. In addition, ink not correlating with recording is discharged as dummy discharging before recording or in the middle of recording. This makes it possible to maintain stable discharging power of the recording head 234.

Figure 11:
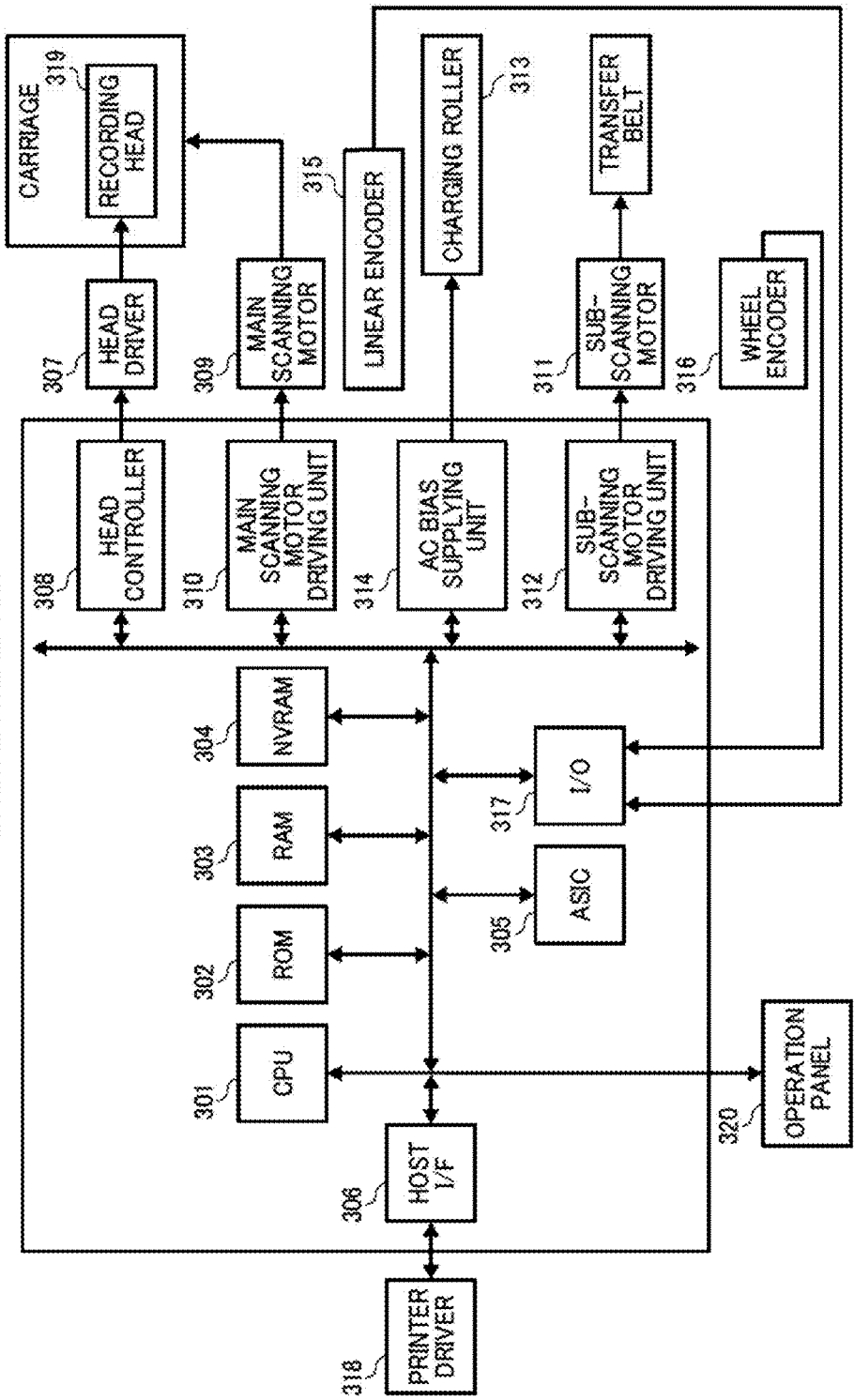
FIG. 11 is a block diagram illustrating a control unit of a conventional image forming apparatus.

FIG. 11 is a block diagram illustrating the control unit of a conventional image forming apparatus. This control unit includes a central processing unit (CPU) 301 to control the transfer operation of recording media (sheets) and the operation of movement of the recording head, programs executed by the CPU 301, a read-only memory (ROM) 302 to store other fixed data, a random access memory (RAM) 303 to temporarily store image data, etc., a non-volatile random access memory (NVRAM) 304 on which data are rewritable to hold data even while the power supply is cut, and an application specific integrated circuit (ASIC) 305 to conduct various signal processing for image data, image processing for sorting, etc., and input and output signals to control the entire apparatus.

In addition, this control unit includes an I/F 306 to transmit and receive data and signals with a host, a head control unit 308 to output image data and accompanying various data thereof to selectively drive the pressure generating device of a recording head 319 to a head driver 307, a main scanning motor drive unit 310 to drive a main scanning motor 309, a sub-scanning motor drive unit 312 to drive a sub-scanning motor 311, an AC bias supplying unit 314 to supply an AC bias to a charging roller 313, and an I/O 317 to input detection pulses from a linear encoder 315 and a wheel encoder 316 and detection signals from various other sensors.

In addition, this control unit is connected to an operation panel 320 to input and display information for the apparatus.

The control unit receives print data, etc. created by the printer driver of a host such as an image processing device such as a home computer, an image reader such as an image scanner, and an imaging device such as a digital camera at the I/F 306 via a cable or a net.

The CPU 301 of the control unit reads and analyzes print data in the reception buffer included in the I/F 306, transfers them to the head control unit 308 after image processing and sorting of the data at the ASIC 305, and outputs image data and drive waveform from the head control unit 308 to the head driver 307 on a suitable timing.

Dot pattern data to output images are created by, for example, storing font data on the ROM 302 or transferring bit map data converted from image data at a printer driver 318 on the host to the apparatus. In this case, the printer driver 318 generates dot pattern data.

The drive waveform generation unit of the head control unit 308 includes a D/A converter to make D/A conversion of pattern data of the drive pulse stored in the ROM 302 and read by the CPU 301, an amplifier, etc., and outputs a drive waveform constituted of a single or multiple drive pulses to the head driver 307.

The head driver 307 drives the recording head 319 by selectively applying a drive pulse constituting a drive waveform imparted from the drive waveform generating unit of the head control unit 308 based on image data (dot pattern data) corresponding to the amount of one line of the recording head input in a serial manner to the pressure generating device of the recording head 319.

The head driver 307 includes, for example, a shift register to input clock signals and serial data as image data, a latch circuit to latch the registry value of the shift register by latch signals, a level conversion circuit (level shifter) to change the level of the output value of the latch circuit, an analogue switch array (switching device) of which the level shifter controls on and off, etc. The head driver 307 controls on and off of the analogue switch array to selectively apply a drive pulse contained in a drive waveform to the pressure generating device of the recording head 319.

FIG. 1 is a perspective diagram illustrating a multi-functional inkjet printer (hereinafter referred to as MFP) 1 including a battery 2 according to embodiments of the present disclosure. The embodiments are not limited to the MFP 1 and can be applied to a single functional printer having only the printer features.

The MFP 1 has a configuration including a scanner unit 3 and a printer 4. The scanner unit 3 includes an automatic document feeder (ADF) 10, where documents are placed. Some type of this machine includes facsimile features and features of printing data directly from USB memories or digital cameras in addition to the printer features and photocopying features.

The printer 4 has a space 5 to insert an ink cartridge, a storage place 6 for paper for printing, a sheet ejection tray 7 to which paper is ejected, an operation panel 8 for operating the printer, a liquid crystal panel 9 to display the condition of the printer, etc. The remaining amount of the battery 2 is visible for users using an LED 11 disposed on the front part of the machine.

The LED 11 is set not to be on to reduce the power consumption when the device is operated in an energy saving mode or is turned off and can be set to be on by pressing a switch 12 when necessary. A switch 13 is to control LED lighting to light the sheet ejection tray 7. Also, a pilot LED 14 to indicate "in charging", an LED 15 indicating "charging error" are provided for a user to see the condition of the printer at a glance.

Figure 2:
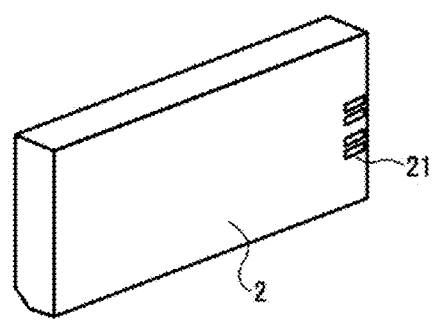
FIG. 2 is a perspective diagram illustrating a battery according to an embodiment of the present disclosure.

FIG. 2 is a perspective diagram illustrating the battery 2 according to an embodiment of the present disclosure. FIG. 2 illustrates the battery 2 to drive the printer. In principle, the battery 2 proper for the printer is assumed to be used. Power is supplied to the printer through a terminal 21.

Figure 3:
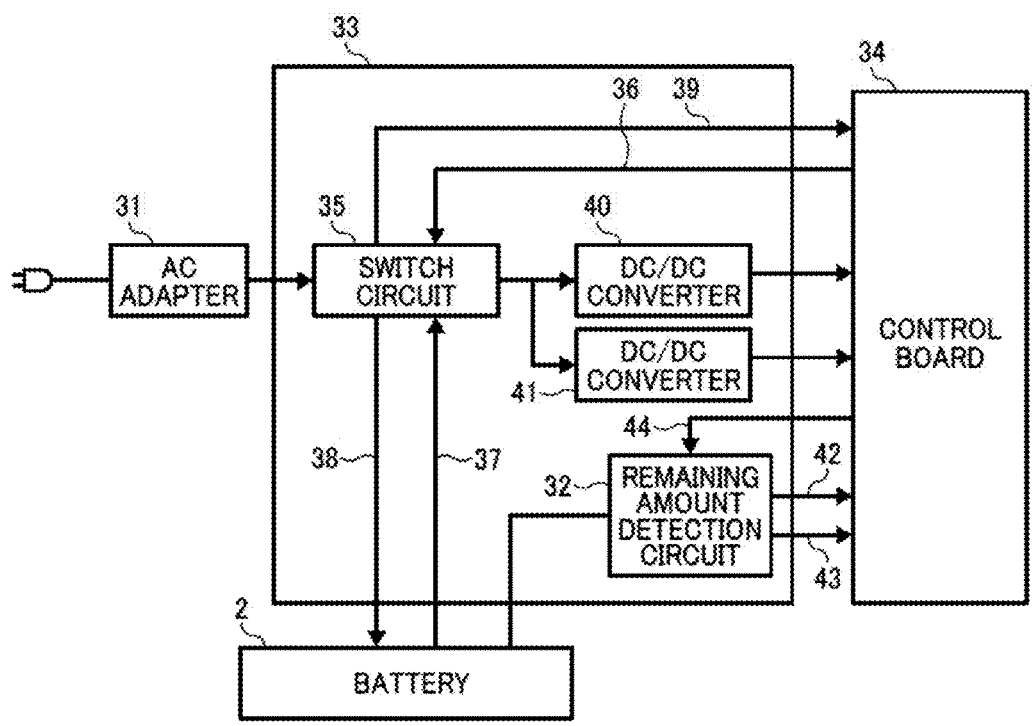
FIG. 3 is a block diagram illustrating a power supply control circuit according to an embodiment of the present disclosure.

FIG. 3 is a block diagram illustrating the power supply control circuit according to an embodiment of the present disclosure. It is possible to use both the battery 2 and an AC adapter 31 to drive the MFP 1. The battery 2 is generally operated on a lithium ion cell or a nickel hydrogen cell.

The power supply control circuit has a configuration including a board 33 on which a switching circuit to switch the power supply of the AC adapter 31 and the battery 2, a remaining amount detection circuit 32 to control battery charge, etc., are implemented and a control board 34 carrying the ASIC and the ROM.

Switching between the AC adapter 31 and the battery 2 are conducted by a switching circuit 35 having an FET and a control IC. Switching 37 to the battery supply and a battery charging control 38 to the battery 2 are conducted by controlling a control signal 36 for the switching circuit 35 at the CPU 301 mounted on the control board 34 illustrated in FIG. 11.

In addition, the CPU 301 determines whether or not power is supplied from the AC adapter 31 by the detection signal 39 from the switching circuit 35. If it is detected that power supply has stopped from the AC adapter 31 while the printer is operated on the AC adapter 31, it is determined that power failure occurs.

Power for use in driving the control board and the print head and transferring (conveying) paper is generated from a single power supply supplied from the AC adapter and the battery using a DC/DC converter 40 and a DC/DC converter 41.

The remaining amount of the battery is detected by comparison with the reference voltage set in advance by a partial resistance at a comparator IC of the battery and the LED 11 shies at five levels according to the remaining amount. In addition, if the remaining amount of the battery decreases while utilizing turning-on and off control of the LED 11, a "remaining amount low signal" 42 is taken out. If the remaining amount of the battery is empty, a "remaining amount empty signal" 43 is taken out to detect the condition at the CPU 301 illustrated in FIG. 11.

When the remaining amount empty signal 43 is detected, the printer stops print operations and conducts power-off control immediately followed by capping for head protection. The signal 44 from the control board 34 is to control the remaining amount detection circuit 32 to determine whether or not to light the LED 11 by detecting the remaining amount.

First Embodiment

Figure 4:
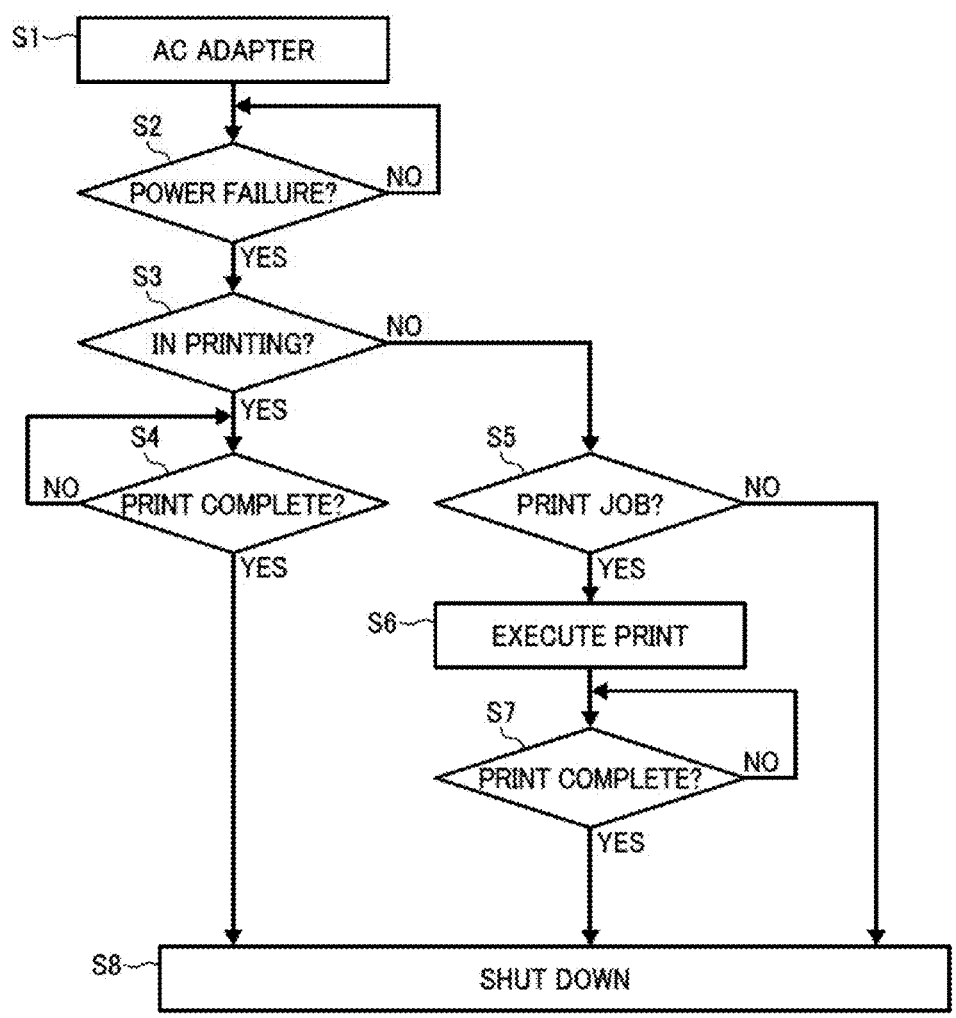
FIG. 4 is a flow chart illustrating shutdown processing according to a first embodiment of the present disclosure.

FIG. 4 is a flow chart illustrating operations of shutdown processing according to a first embodiment. When the CPU 301 receives the detection signal 39 of the switching circuit 35 in the condition in which power is supplied (Step S1), the CPU 301 determines that the power supply has stopped (Step S2, YES) and switches control according to the condition of the printer.

For example, the CPU 301 determines whether the printer is in print operation or there is a print job (Steps S3 and S5). If the printer is in print operation (Step S3, YES), the operation continues until it completes (Step S4). When the print operation completes (Step S4, YES), the power supply of the printer is shut down (Step S8).

When there is a print job queuing (Step S5, Yes), the print operation is completed after receiving the print job (Steps S6 and S7) and thereafter the power supply of the printer is shut down (Step S8). When there is no print job queuing (Step S5, No), the power supply of the printer is shut down (Step S8). Accordingly, degradation of productivity caused by abrupt shutdown during printing is avoided.

Second Embodiment

Figure 5:
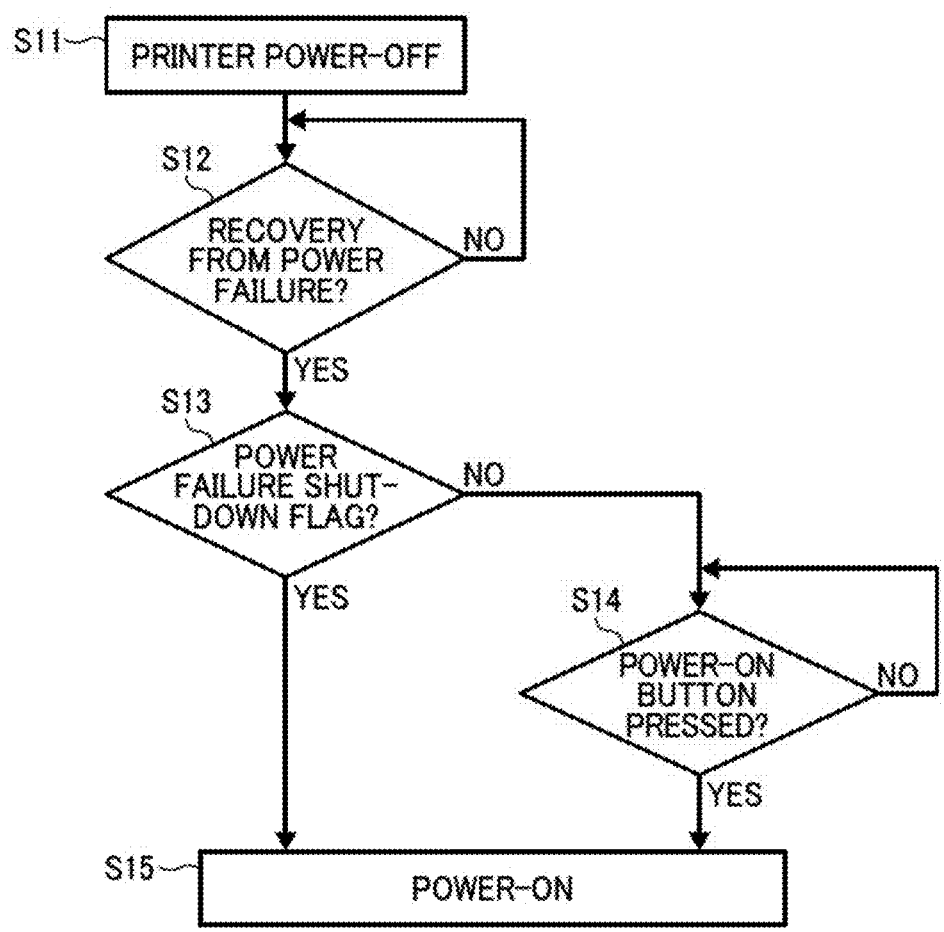
FIG. 5 is a flow chart illustrating shutdown processing according to a second embodiment of the present disclosure.

FIG. 5 is a flow chart illustrating shutdown processing according to a second embodiment of the present disclosure. When the printer is shut down by detection of power failure, a shutdown flag ascribable to power failure is set on in the ROM 302 illustrated in FIG. 1.

When power supply from the AC adapter 31 is back (Step S12, Yes) while the printer is powered off (Step S11), the CPU 301 determines that the power failure is canceled based on the power supply detection signal 39 of the AC adapter 31 of the switching circuit 35 illustrated in FIG. 35. Thereafter, the CPU 301 makes an access to the ROM 302 to confirm whether there is a shutdown flag thereon (Step S13).

If the shutdown flag ascribable to power failure is confirmed (Step S13, YES), the CPU 301 executes operations of automatic power-on of the printer to shift to stand-by state (Step S15). Power of the printer is automatically back after canceling power failure, which is improve convenience.

If the shutdown flag ascribable to power failure is not confirmed (Step S13, No), the power of the printer is turned on (Step S15) by pressing down the power button (Step S14).

Third Embodiment

Figure 6A:
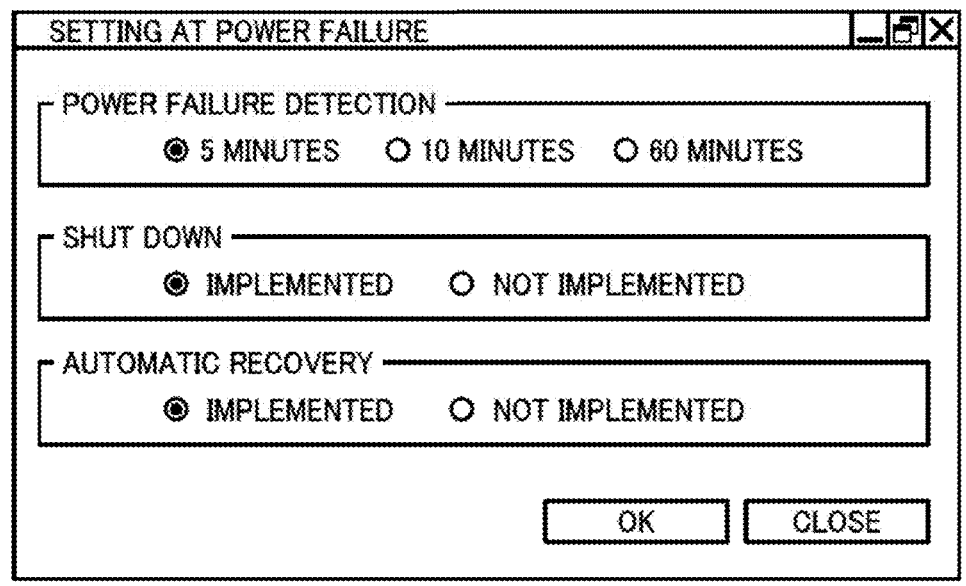
FIGS. 6A and 6B are diagrams illustrating a setting at power failure.
Figure 6B:
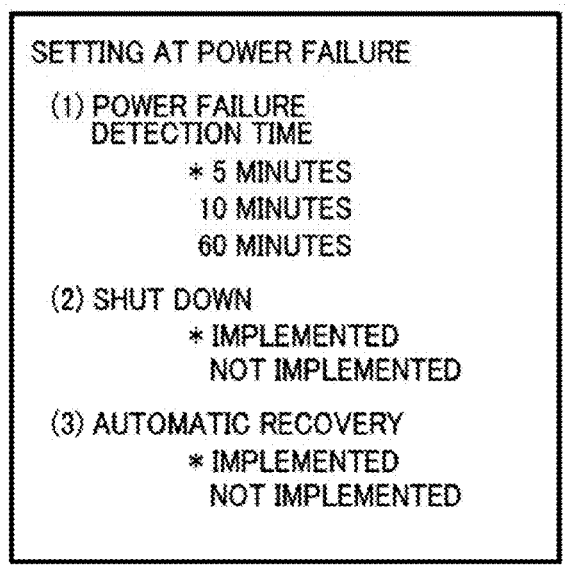
Figure 7:
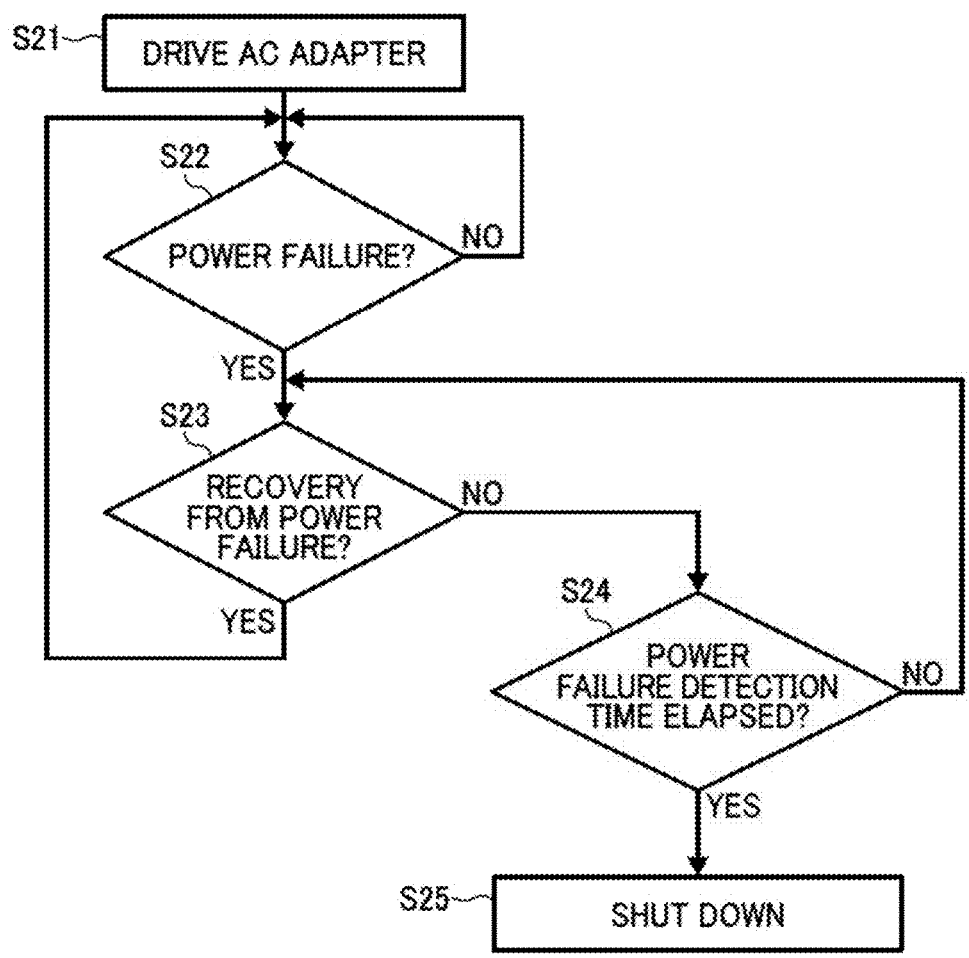
FIG. 7 is a flow chart illustrating shutdown processing according to a third embodiment of the present disclosure.

FIGS. 6A and 6B are diagrams illustrating a setting at power failure. FIG. 7 is a flow chart illustrating shutdown operation according to the second embodiment. Users can set the shutdown at power failure and the automatic power-on when power is back after power failure in the printer in advance. As illustrated in FIG. 6, this can be set on the driver display of the printer or the operation panel 8.

In addition, if the plug of the AC adapter 31 is pulled out for a little while to move the printer, etc., the CPU 301 possibly determines that power failure occurs and shuts down the printer. To avoid this, the CPU 301 allows users to preset a time (power failure detection time) during which such power-off is not determined as power failure after power supply from the AC adapter has stopped. This can be set according to the user condition, which contributes to improvement of convenience.

During the time between detection of power failure and shutdown, the CPU 301 executes detection of recovery from power failure in the flow chart illustrated in FIG. 7 and turns back to the starting point when recovery from power failure is detected.

The CPU 301 drives the AC adapter 31 (Step S21), power supply from the AC adapter 31 stops (Step S22, Yes), the CPU 301 executes detection of recovery from power failure, and if the recovery is detected (Step S23, Yes), the processing is set to be back to the start position.

If no recovery from power failure is detected (Step S23, No), after the power failure detection time elapses (Step S24, Yes), the printer is shut down (Step S25). If the power failure detection time does not elapse (Step S24, No), the CPU 301 detects whether power is back (Step S23).

Fourth Embodiment

Figure 8:
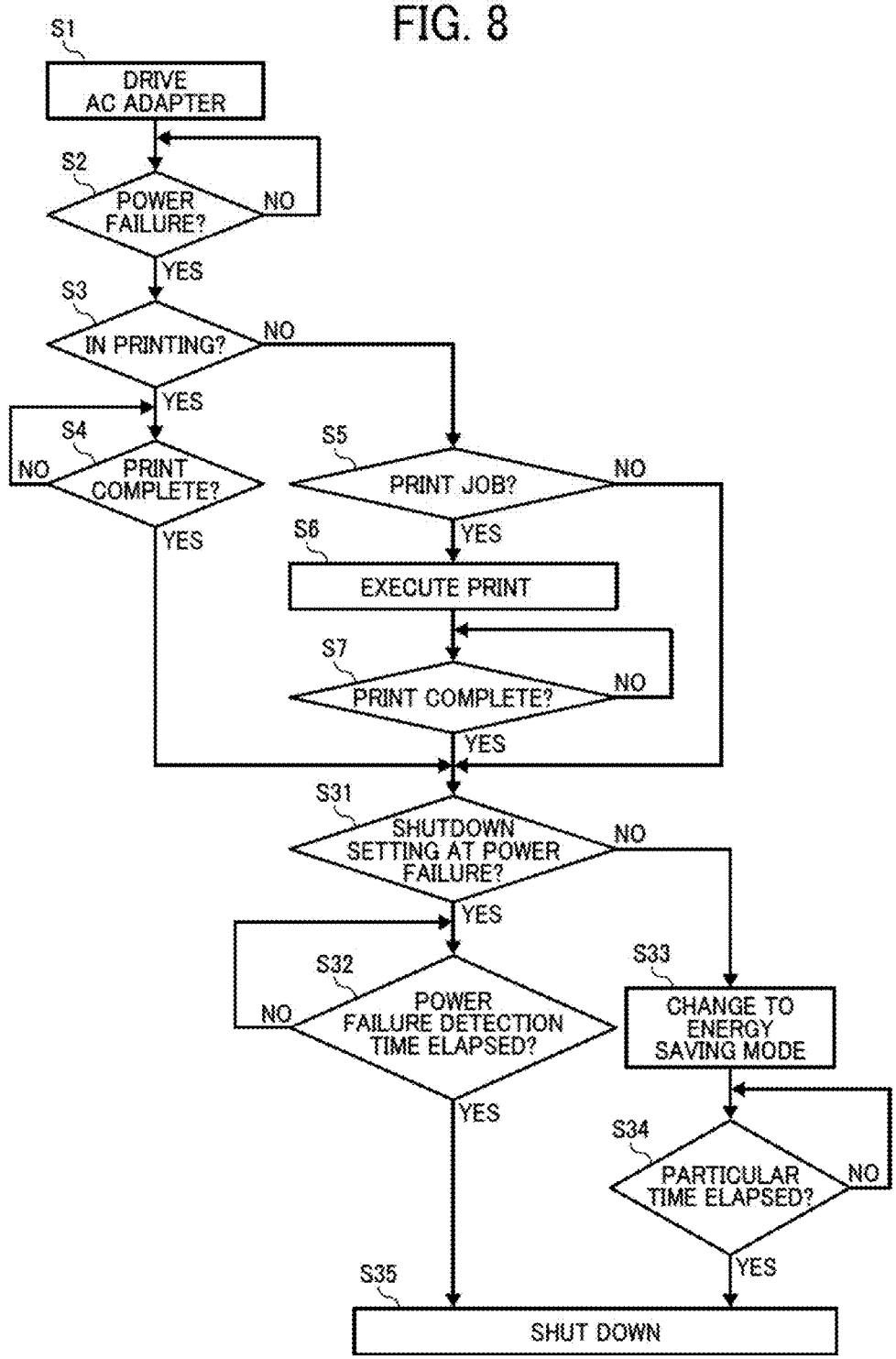
FIG. 8 is a flow chart illustrating shutdown processing according to a fourth embodiment of the present disclosure.

FIG. 8 is a flow chart illustrating processing of shutdown according to a fourth embodiment. The same reference numerals are assigned to the same flow as FIG. 4 and the descriptions thereof are omitted.

If a user does not set the shutdown setting in advance (Step S31, No) at the device illustrated in FIG. 7, the printer always shifts to the energy saving mode (Step S33) if power failure is detected except when the printer is printing images. If there is no print job for a particular period of time (Step S34, Yes), the printer is shut down (Step S35). Accordingly, the battery consumption is reduced as much as possible.

If shutdown at power failure is set (Step S31, Yes), after the power failure detection time elapses (Step S32, Yes), the printer is shut down (Step S35).

According to this embodiment, a printer is suitably shut down at power failure depending on the usage status of the printer to reduce the consumption of battery power as much as possible. Therefore, while wasteful battery consumption at power failure is reduced, the printer is available when print operation on battery is required.

According to the present invention, an image forming apparatus is provided which reduces wasteful battery consumption at an occurrence of power failure and is available when printing operation on battery is necessary.

The embodiments described above are just preferred embodiments and the present invention is not limited thereto. Various modifications can be made without departing from the scope of the present invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image forming apparatus comprising:
    a first detector to detect the image forming apparatus being driven by an AC adapter;
    a second detector to detect the image forming apparatus being driven by a battery;
    a third detector to detect an occurrence of power failure; and
    a first device to shut down a power supply of the image forming apparatus in a case of the power failure.

2. The image forming apparatus according to claim 1, further comprising a fourth detector to detect the image forming apparatus executing printing and a fifth detector to detect whether there is a print job, wherein the power supply is shut down after all printing is complete in the case of the power failure.

3. The image forming apparatus according to claim 1, further comprising a second device to hold that the power supply has been shut down due to the power failure, a sixth detector to detect recovery from the power failure, and a third device to automatically turn on the power supply of the image forming apparatus when the power supply is shut down due to the power failure.

4. The image forming apparatus according to claim 1, further comprising a fourth device to allow a user to preset a power failure detection time, shutdown, and automatic recovery.

5. The image forming apparatus according to claim 4, further comprising a fifth device to shift the image forming apparatus to energy-saving mode unless executing printing and conduct shutdown after a particular time elapses when no setting is made to the fourth device.

* * * * *